No. 816,429. PATENTED MAR. 27, 1906.
J. F. BURNS.
DEVICE FOR SUPPORTING CABLES OF ELECTRIC LAMPS.
APPLICATION FILED JULY 12, 1905.

Witnesses
Lottie Prior
Lucia C Damell

Inventor
James F. Burns.
Ward Cameron,
by
Attys.

UNITED STATES PATENT OFFICE.

JAMES F. BURNS, OF ALBANY, NEW YORK.

DEVICE FOR SUPPORTING CABLES OF ELECTRIC LAMPS.

No. 816,429.  Specification of Letters Patent.  Patented March 27, 1906.

Application filed July 12, 1905. Serial No. 269,307.

*To all whom it may concern:*

Be it known that I, JAMES F. BURNS, a citizen of the United States of America, and a resident of the city and county of Albany, State of New York, have invented certain new and useful Improvements in Devices for Supporting Cables of Electric Lamps, of which the following is a specification.

My invention relates to devices for supporting a cable for an electric lamp; and the object of my invention is to provide a reel or spool upon which an electric-lamp cable may be wound and unwound, as desired, and which is so adjusted and connected up that by turning the light on or off the reel or spool may be locked or unlocked and when unlocked the cable may be unwound from the reel to the extent desired, and when the pull on the cable is released the reel will automatically wind up the cable. I attain this object by means of the mechanism illustrated in the accompanying drawings, in which—

Figure 1:
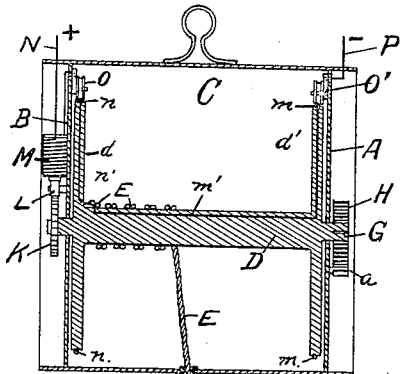
Figure 2:
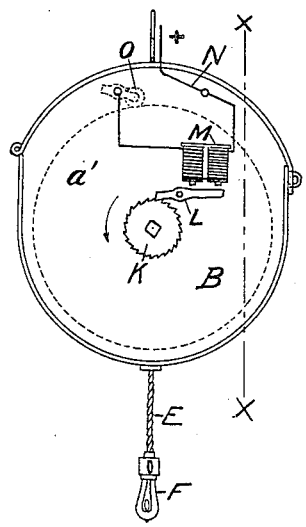
Figure 3:
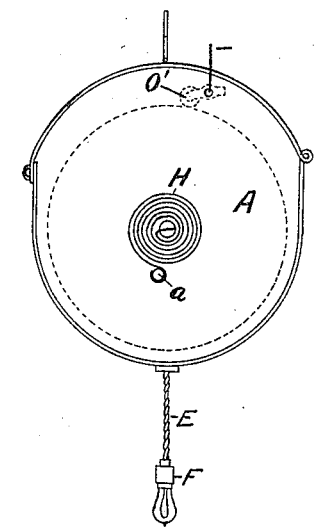

Figure 1 is a section along the lines X X on Fig. 2. Fig. 2 is an end elevation. Fig. 3 is an elevation of the end opposite that shown in Fig. 2.

Similar letters refer to similar parts throughout the several views.

Mounted in the sides A B of the frame C is a reel D, to which is secured the cable E, connected with the lamp F. Projecting from one side of the hub of the reel D is an arbor G, to which one end of the coil-spring H is attached, the other end of said spring being secured to the side A of the frame at $a$. To the hub of the reel G opposite that to which the arbor is attached I secure the ratchet K, with which a dog L on the side $a'$ of the frame engages. To the side $a'$ of the frame C, I place a magnet M within operative distance of the dog L, so arranged that when the magnet is charged the dog L will be acted upon as an armature and drawn into contact with the ratchet K. The wire N of an electric-light circuit is connected with the magnet M and is also preferably connected with a sheave O, the magnet preferably being between the sheave O and the source of electric supply. The sheave O preferably engages with the periphery of the side $d$ of the reel D, there being, preferably, arranged around the periphery of said side $d$ a wire $n$, with which the sheave O engages. Within the side $d$ of the reel or connected therewith in any suitable manner is, preferably, the wire $n$, which connects with the lamp-cable E, said cable E also being preferably connected with the wire $m'$, which is preferably connected with the wire $m$, with which the sheave O', similar to the sheave O, preferably engages on the periphery of the side $d'$ of the reel D, said sheave O' being preferably connected by the wire P of an electric-light circuit. As thus arranged and connected up the electric current will be conveyed to the lamp F, which is connected with the cable E through the magnet M, sheave O, wires $n$ and $n'$, and out through the wires $m$ and $m'$ and wire P. While the light is burning, the current being complete, the magnet is charged and the dog L is in contact with the ratchet K, and the lamp may be taken to any distance from the reel that the length of the cable will allow. The pull on the reel being against the tension of the spring H and when the pull is released on the cable and the lamp is extinguished the dog released from ratchet, the spring will tend to wind the cable on the reel, thus preventing the cable from being tangled or getting in the way.

This makes a very convenient apparatus for use about an engine-room or other place where a light is frequently needed under and around machinery at some distance from the place where it is usually fixedly attached or where it would be convenient to connect the same permanently. By my arrangement I can take an electric lamp in different parts of a room and place it under a machine and bring the light directly to the point where observation is necessary, and when through with it in a certain place the reel will automatically wind up the slack of the cable and prevent it from being tangled or injured, as might occur if it were left in the place where the lamp was used.

I do not limit myself to the means of connecting the lamp-cable with the electric supply-wires.

What I claim as my invention, and desire to secure by Letters Patent, is—

1. The combination of a frame; a reel mounted therein; a means for rotating said reel; a ratchet connected with said reel; a dog adapted to engage said ratchet; a magnet in operative connection with said dog; a lamp-cable; a lamp attached to said cable; said cable placed on said reel; a means for connecting said magnet and said cable with an electric circuit, substantially as described.

2. The combination of a frame; a reel mounted therein; a spring connected with said frame and with an arbor on the hub of said reel; a ratchet connected with said reel; a dog engaging said ratchet connected with said frame; a magnet in operative connection with said dog; sheaves connected with the peripheries of said reel, respectively; a lamp-cable adapted to be wound about said reel; a means for placing said lamp-cable and magnet and sheaves within an electric circuit, substantially as described.

Signed at Albany, New York, this 7th day of July, 1905.

JAMES F. BURNS.

Witnesses:
FREDERICK W. CAMERON,
LOTTIE PRIOR.